United States Patent
Choi et al.

(10) Patent No.: US 9,104,267 B2
(45) Date of Patent: Aug. 11, 2015

(54) CAPACITIVE MULTI-TOUCH SYSTEM AND METHOD OF CONTROLLING THE SAME

(71) Applicant: SAMSUNG ELECTRONICS CO., LTD., Suwon-Si, Gyeonggi-Do (KR)

(72) Inventors: Kwang-Ho Choi, Seoul (KR); Sang-Woo Kim, Gyeonggi-do (KR); Chang-Ju Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 36 days.

(21) Appl. No.: 14/088,533

(22) Filed: Nov. 25, 2013

(65) Prior Publication Data
US 2014/0152614 A1   Jun. 5, 2014

(30) Foreign Application Priority Data
Dec. 3, 2012   (KR) .................... 10-2012-0138933

(51) Int. Cl.
*G06F 3/044* (2006.01)
*G06F 3/041* (2006.01)

(52) U.S. Cl.
CPC ............. *G06F 3/0418* (2013.01); *G06F 3/044* (2013.01); *G06F 2203/04104* (2013.01)

(58) Field of Classification Search
CPC .......... G06F 3/041–3/047; G06F 2203/04104
See application file for complete search history.

(56) References Cited

U.S. PATENT DOCUMENTS

| | | | |
|---|---|---|---|
| 6,624,835 B2 | 9/2003 | Willig | |
| 7,742,109 B2 | 6/2010 | Weitbruch et al. | |
| 8,294,687 B1 * | 10/2012 | Ksondzyk | 345/173 |
| 2008/0062148 A1 | 3/2008 | Hotelling et al. | |
| 2010/0328257 A1 * | 12/2010 | Noguchi et al. | 345/174 |
| 2011/0037734 A1 * | 2/2011 | Pance et al. | 345/177 |
| 2011/0096011 A1 | 4/2011 | Suzuki | |
| 2011/0115729 A1 | 5/2011 | Kremin et al. | |
| 2011/0215994 A1 | 9/2011 | Oh et al. | |
| 2011/0285654 A1 * | 11/2011 | Park et al. | 345/173 |
| 2012/0200524 A1 * | 8/2012 | Vallis et al. | 345/174 |
| 2012/0218020 A1 * | 8/2012 | Erdogan et al. | 327/337 |
| 2013/0176268 A1 * | 7/2013 | Li et al. | 345/174 |
| 2013/0176269 A1 * | 7/2013 | Sobel et al. | 345/174 |
| 2013/0176270 A1 * | 7/2013 | Cattivelli et al. | 345/174 |
| 2013/0176271 A1 * | 7/2013 | Sobel et al. | 345/174 |
| 2013/0176272 A1 * | 7/2013 | Cattivelli et al. | 345/174 |
| 2013/0176273 A1 * | 7/2013 | Li et al. | 345/174 |
| 2013/0176274 A1 * | 7/2013 | Sobel et al. | 345/174 |
| 2013/0176275 A1 * | 7/2013 | Weaver et al. | 345/174 |

FOREIGN PATENT DOCUMENTS

| | | |
|---|---|---|
| JP | 2011090519 | 5/2011 |
| KR | 1020050052192 | 6/2005 |

(Continued)

*Primary Examiner* — Gene W Lee
(74) *Attorney, Agent, or Firm* — F. Chau & Associates, LLC

(57) ABSTRACT

A capacitive multi-touch system includes a touch sensor pane, a front-end circuit, and a digital signal processor. The touch sensor panel generates a capacitance signal corresponding to a touch input. The front-end circuit converts the capacitance signal to a sensing channel signal. The digital signal processor receives a common voltage ($V_{COM}$) from a display device, calculates a noise interval of two neighboring noise peaks of the common voltage, and performs a noise filtering operation on the sensing channel signal using a noise filter path. The noise filter path is selected from a plurality of noise filter paths based on the noise interval.

17 Claims, 15 Drawing Sheets

(56) References Cited

FOREIGN PATENT DOCUMENTS

| KR | 1020070051115 | 5/2007 |
| KR | 1020070063634 | 6/2007 |
| KR | 1020100050355 | 5/2010 |
| KR | 1020100052591 | 5/2010 |

* cited by examiner

CAPACITIVE MULTI-TOUCH SYSTEM AND METHOD OF CONTROLLING THE SAME

CROSS-REFERENCE TO RELATED APPLICATION

This application claims priority under 35 U.S.C. §119 to Korean Patent Application No. 10-2012-0138933, filed on Dec. 3, 2012 in the Korean Intellectual Property Office, the disclosure of which is incorporated by reference herein in its entirety.

TECHNICAL FILED

The present inventive concept relates to a capacitive multi-touch system and a method of controlling the capacitive multi-touch system.

DISCUSSION OF RELATED ART

Touch screens are used as an input device in computers, tablets, or smart phones. Touch screens include a touch sensor panel having a touch-sensitive surface. The touch sensor is disposed on a display device. Touch inputs on the touch screens are made while the display device displays an image.

SUMMARY

According to an exemplary embodiment of the inventive concept, a capacitive multi-touch system includes a touch sensor pane, a front-end circuit, and a digital signal processor. The touch sensor panel generates a capacitance signal corresponding to a touch input. The front-end circuit converts the capacitance signal to a sensing channel signal. The digital signal processor receives a common voltage ($V_{COM}$) from a display device, calculates a noise interval of two neighboring noise peaks of the common voltage, and performs a noise filtering operation on the sensing channel signal using a noise filter path. The noise filter path is selected from a plurality of noise filter paths based on the noise interval.

According to an exemplary embodiment of the inventive concept, a method of controlling a capacitive multi-touch system is provided. A capacitance signal corresponding to an input touch is converted to a sensing channel signal. A noise spectrum of a common voltage ($V_{COM}$) is analyzed to generate a filter selection signal. A filtering operation is performed on the sensing channel signal using a noise filtering operation selected by the filter selection signal.

According to an exemplary embodiment of the inventive concept, a capacitive multi-touch system includes a display device, a touch sensor panel, and a digital signal processor. The display device operates using a common voltage. The touch sensor panel is disposed on the display device, generating a sensing input signal corresponding to a touch input. The digital signal processor analyzes noise characteristics of the common voltage and performs a noise filtering operation on the sensing input signal based on the noise characteristics.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF THE EMBODIMENTS

Figure 1:
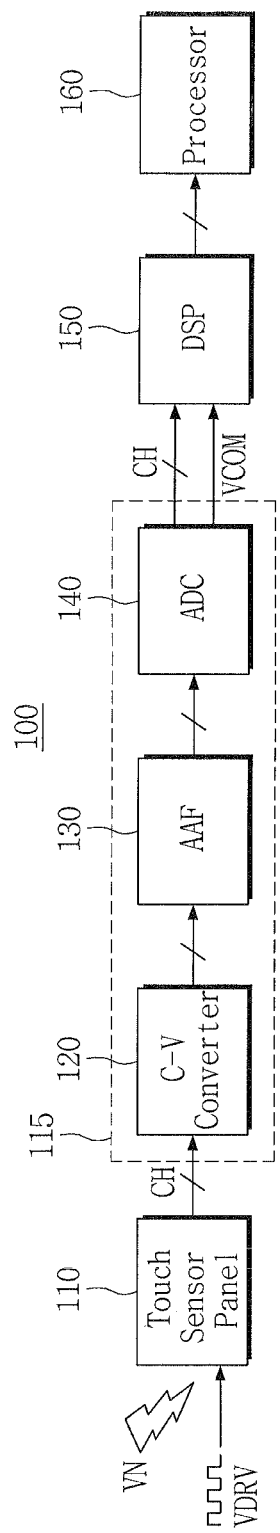
FIG. 1 is a block diagram illustrating a capacitive multi-touch system according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a block diagram illustrating a capacitive multi-touch system 100 according to an exemplary embodiment of the inventive concept.

Referring to FIG. 1, the capacitive multi-touch system 100 includes a touch sensor panel 110, a front-end circuit 115, and a digital signal processor 150.

The touch sensor panel 110 operates in response to a driving voltage VDRV and a touch input, and generates a capacitance signal corresponding to a touch input. The front-end circuit 115 converts the capacitance signal into a first voltage signal corresponding to the capacitance signal, and performs filtering and analog-to-digital conversion on the first voltage signal. The digital signal processor 150 performs a digital signal processing operation on an output signal of the front-end circuit 115. The digital signal processor 150 receives a common voltage $V_{COM}$ from a display device, analyzes a spectrum of noise included in the common voltage $V_{COM}$, and selects a noise filter based on the analysis results to perform filtering. A plurality of channels CH is disposed between the touch sensor panel 110 and the digital signal processor 150. The common voltage ($V_{COM}$) serves as a reference DC voltage for the display device. For example, the common voltage ($V_{COM}$) is commonly provided to pixels of the display device.

The capacitive multi-touch system 100 further includes a processor 160 that moves objects, such as a cursor or a pointer, on the display device in response to an output of the digital signal processor 150.

The front-end circuit 115 includes a capacitance-voltage (C-V) converter 120, an anti-aliasing filter 130, and an analog-to-digital converter 140.

The C-V converter 120 converts the capacitance signal into a first voltage signal corresponding to the capacitance signal. The anti-aliasing filter 130 eliminates noise included in the first signals to generate a second voltage signal. The analog-to-digital converter 140 converts the second voltage signal into a corresponding digital signal.

The capacitive multi-touch system 100 analyzes and filters display noise using the common voltage $V_{COM}$. The noise characteristics of the common voltage $V_{COM}$ is substantially similar to the display noise characteristics of the first voltage signal generated from touching on the touch sensor panel 110. The filtering operation of the capacitive multi-touch system 100 is performed using various methods according to noise intervals of the common voltage $V_{COM}$. For example, the capacitive multi-touch system 100 compares its filter bandwidth the noise intervals and a filter bandwidth, and performs filtering using a filtering path selected according to the comparison results. The filter bandwidth represents a bandwidth of a digital filter included in the capacitive multi-touch system 100. Alternatively, the filter bandwidth may represent one of other filters included in the capacitive multi-touch system 100.

The digital signal processor 150 performs filtering using a normal-frequency selecting filter when the bandwidth of the normal-frequency selecting filter is narrower than a noise interval, performs filtering using a decimation-frequency selecting filter when the filter bandwidth is wider than the noise interval and narrower than double the noise interval, and perform filtering using a moving average filter when the filter bandwidth is wider than double the noise interval. The moving average filter controls a moving average value using a tap.

Figure 2:
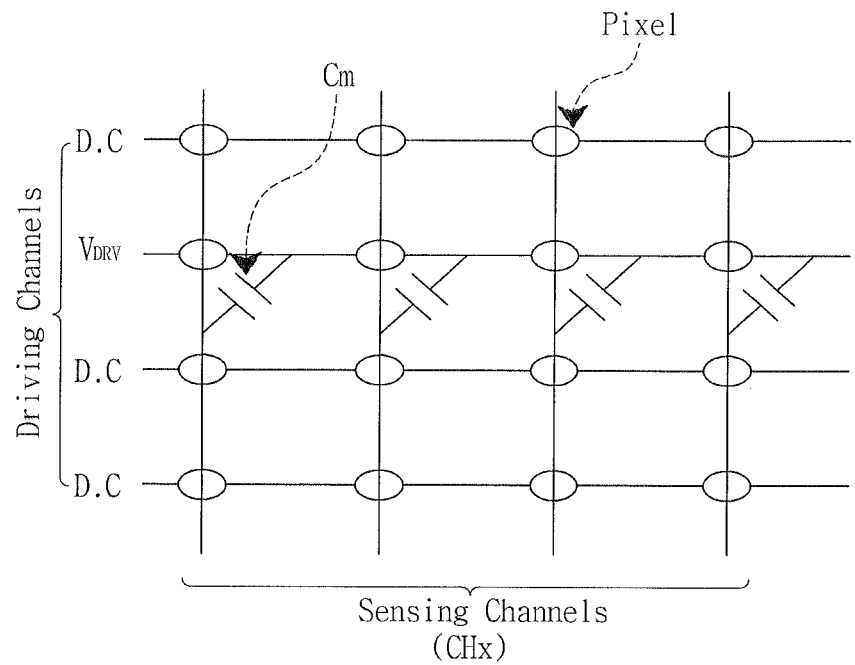
FIG. 2 is a diagram illustrating a touch sensor panel according to an exemplary embodiment of the inventive concept.

FIG. 2 is a diagram illustrating a touch sensor panel according to an exemplary embodiment of the inventive concept. The touch sensor panel 110 may be implemented as shown in FIG. 2.

Referring to FIG. 2, the touch sensor panel 110 includes a pixel that is located at a position where a driving channel and a sensing channel cross each other. A mutual capacitance that occurs between a driving channel and a sensing channel exists near a pixel. A driving voltage may be applied to one of the driving channels, and a D.C. voltage may be applied to the other driving channels.

Figure 3:
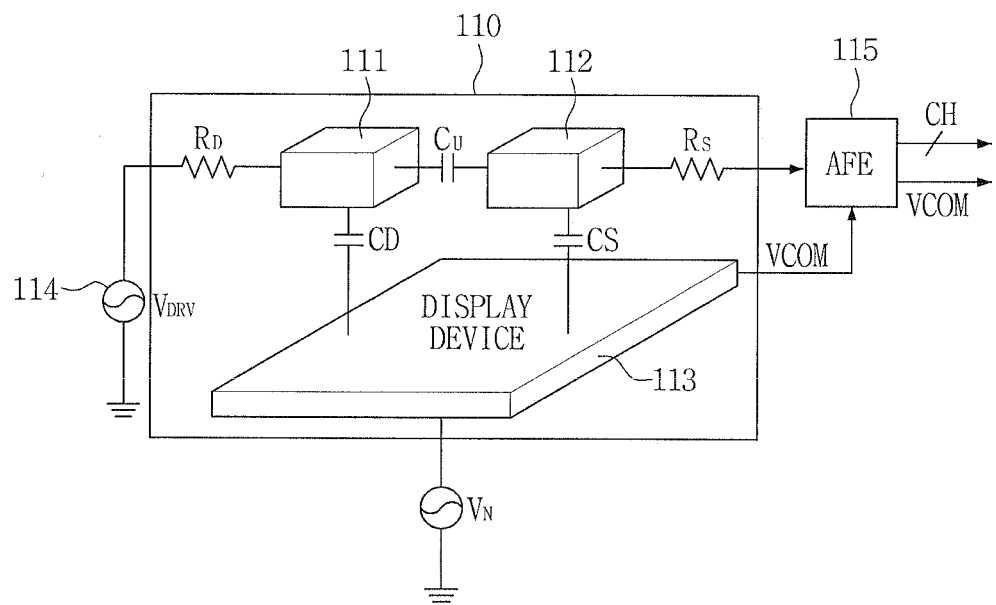
FIG. 3 is a circuit diagram illustrating parasitic components of a touch sensor panel of the capacitive multi-touch system according to an exemplary embodiment of the inventive concept.

FIG. 3 is a circuit diagram illustrating parasitic components of a touch sensor panel according to an exemplary embodiment. The touch sensor panel 110 may be implemented as shown in FIG. 3.

Referring to FIG. 3, the touch sensor panel 110 is disposed on a display device 113. The touch sensor panel 110 includes a driving channel 111 and a sensing channel 112. A driving voltage VDRV generated by a voltage source 114 is applied to the driving channel 111. The touch sensor panel 110 may include various parasitic elements. For example, a parasitic resistance RD exists between the voltage source 114 and the driving channel 111. A parasitic capacitance CU exists between the driving channel 111 and the sensing channel 112. A parasitic resistance RS exists between the sensing channel 112 and the front-end circuit 115. A parasitic capacitance CD exists between a display device 113 and the driving channel 111. A parasitic capacitance CS exists between the display device 113 and the sensing channel 112. Noise VN exists between the display device 113 and the ground. The common voltage $V_{COM}$ is transmitted from the display device to the digital signal processor 150 through the front-end circuit 115.

Figure 4:
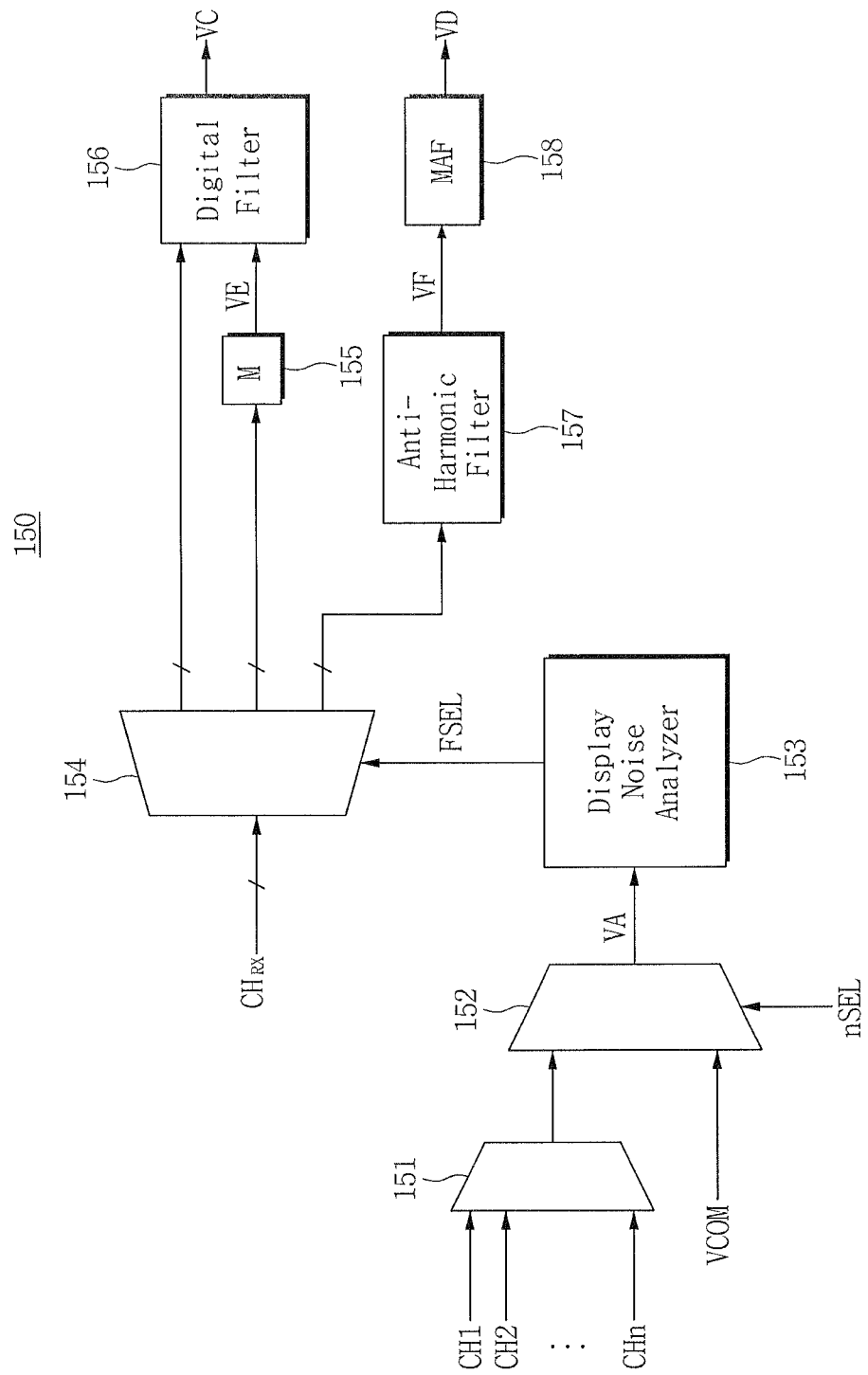
FIG. 4 is a circuit diagram illustrating a digital signal processor according to an exemplary embodiment of the inventive concept.

FIG. 4 is a circuit diagram illustrating a digital signal processor according to an exemplary embodiment. The digital signal processor 150 of FIG. 1 may be implemented as shown in FIG. 4.

Referring to FIG. 4, the digital signal processor 150 includes a first multiplexer 151, a second multiplexer 152, a display noise analyzer 153, a demultiplexer 154, a decimation filter 155, a digital filter 156, an anti-harmonic filter 157, and a moving average filter 158.

The first multiplexer 151 successively outputs the plurality of digital signals received from channels CH1 to CHn to the second multiplexer 152. The channels CH1 to CHn are channel signals measured when a display driving voltage is not applied. That is, signals corresponding to the channels CH1 to CHn may be measured when the display driving voltage is not applied to measure the display noise.

The second multiplexer 152 selects one of the first multiplexer 151 and the common voltage ($V_{COM}$) to generate a first signal VA in response to a selection signal nSEL. For example, when the common voltage $V_{COM}$ is available, the common voltage $V_{COM}$ is selected in response to the selection signal nSEL. When the common voltage $V_{COM}$ is not available, the output of the first multiplexer 151 is selected in response to the selection signal nSEL. The selection signal nSEL represents the status of whether the common voltage $V_{COM}$ is available.

The display noise analyzer 153 analyzes noise of a display device to generate a filter selecting signal FSEL. For example, the display noise analyzer 153 outputs the filter selecting signal FSEL to the demultiplexer 154 to select a noise filter.

If the display noise analyzer 153 receives the common voltage $V_{COM}$, the display noise analyzer 153 analyzes a noise spectrum of the common voltage $V_{COM}$, and selects a noise filter based on the analyzed result. The display noise analyzer 153 will be described in detail referring to FIG. 5.

The demultiplexer 154 selects a noise filter in response to the filter selecting signal FSEL. For example, when the display driving voltage is not applied, the touch sensing panel 110 outputs a sensing channel signal $CH_{RX}$ to the demultiplexer 154 through the front-end circuit 115. The demultiplexer 154 outputs the sensing channel signal $CH_{RX}$ to one of a plurality of filters in response to the filter selecting signal FSEL.

The decimation filter 155 performs decimation filtering on the sensing channel signal $CH_{RX}$ to generate a second signal VE.

The digital filter 156 performs filtering selectively on the sensing channel signal $CH_{RX}$ and the second signal VE. The anti-harmonic filter 157 eliminates harmonics included in the sensing channel signal $CH_{RX}$, and the moving average filter 158 calculates a moving average of an output signal VF of the anti-harmonic filter 157.

Figure 5:
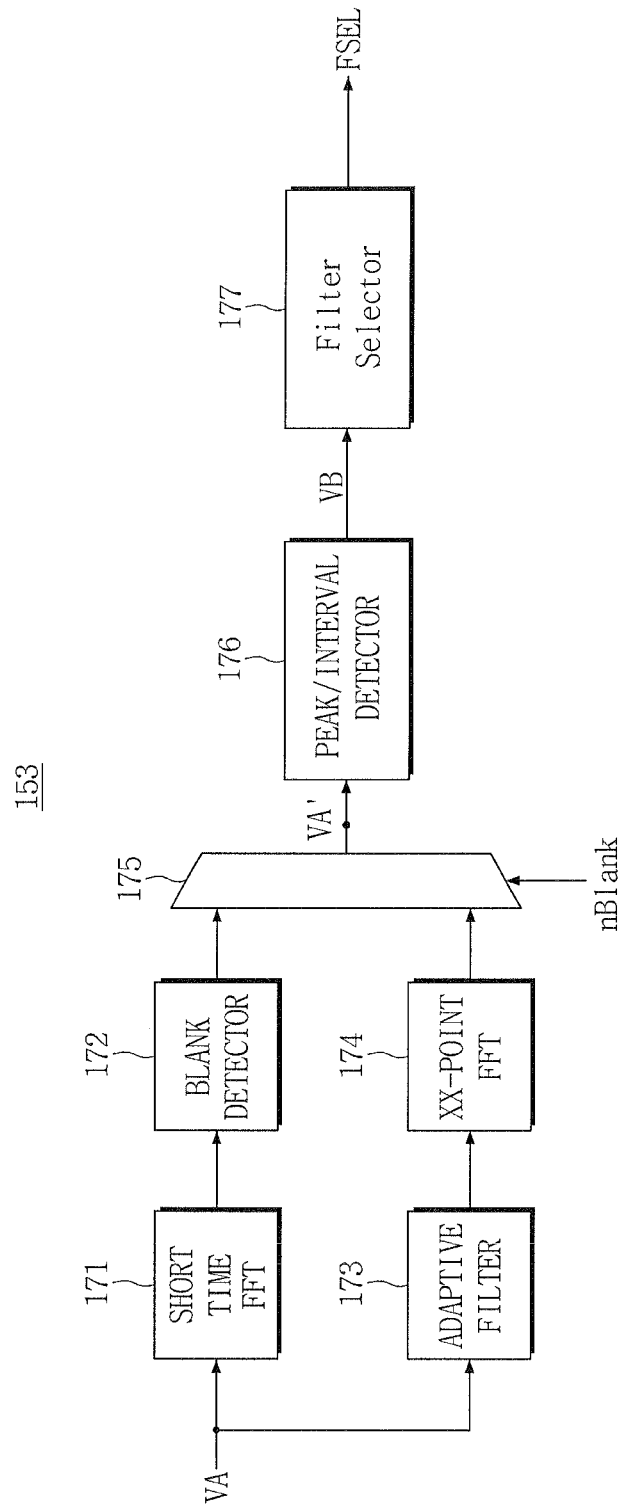
FIG. 5 is a circuit diagram illustrating a display noise analyzer according to an exemplary embodiment of the inventive concept.

FIG. 5 is a circuit diagram illustrating a display noise analyzer according to an exemplary embodiment. The display noise analyzer 153 of FIG. 4 may be implemented as shown in FIG. 5.

Referring to FIG. 5, the display noise analyzer 153 includes a first Fourier transformer 171 that performs a short-time Fourier transform on the first signal VA, a blank detector 172 that detects a blank of noise included in an output signal of the first Fourier transformer 171, an adaptive filter 173 that performs adaptive filtering on the first signal VA, a second Fourier transformer 174 that performs a point Fourier transform on an output signal of the adaptive filter 173, a fourth multiplexer 175 that selects one of an output signal of the blank detector 172 and an output signal of the second Fourier transformer 174, a peak/interval detector 176 that detects a peak and interval of noise included in an output signal of the fourth multiplexer 175, and a filter selector 177 that outputs a filter selecting signal FSEL for selecting a filter. The peak/interval detector 176 receives a frequency spectrum information VA' of the first signal VA and generates a third signal VB. The frequency spectrum information VA' is generated using the first Fourier transformer 171 or the second Fourier transformer 174. The blank control signal nBLANK may be selectively activated according to complexity of a hardware. The display noise analyzer 153 may be implemented without including the multiplexer 175. In that case, a display noise analyzer may include one of two noise analyzing paths. For example, the display noise analyzer 153 may include an upper path having the first Fourier transformer 171 and the blank detector 172 of FIG. 5. Alternatively, the display noise analyzer 153 may a lower path including the adaptive filter 173 and the second Fourier transformer 174 of FIG. 5.

The filter selector 177 receives the second signal VB, and calculates a noise interval between two neighboring peak values of the frequency spectrum information VA'. The peak/interval detector 176 determines which filter to select using the second signal VB.

For example, if the noise interval is greater than the filter bandwidth of the digital filter 156 of FIG. 4, the filter selector 177 generates a filter selecting signal FSEL to select the digital filter 156. The filter selecting signal FSEL is transmitted to the demultiplexer 154.

If the filter bandwidth is greater than the noise interval but less than two times of the noise interval, the filter selector 177 generates a filter selecting signal FSEL to select the decimation filter 155 of FIG. 4. The filter selecting signal FSEL is transmitted to the demultiplexer 154 of FIG. 4.

If the filter bandwidth is greater than two times of the noise interval, the filter selector 177 generates a filter selecting signal FSEL to select the moving average filter of FIG. 4. The filter selecting signal FSEL is transmitted to the demultiplexer 154 of FIG. 4.

Figure 6A:
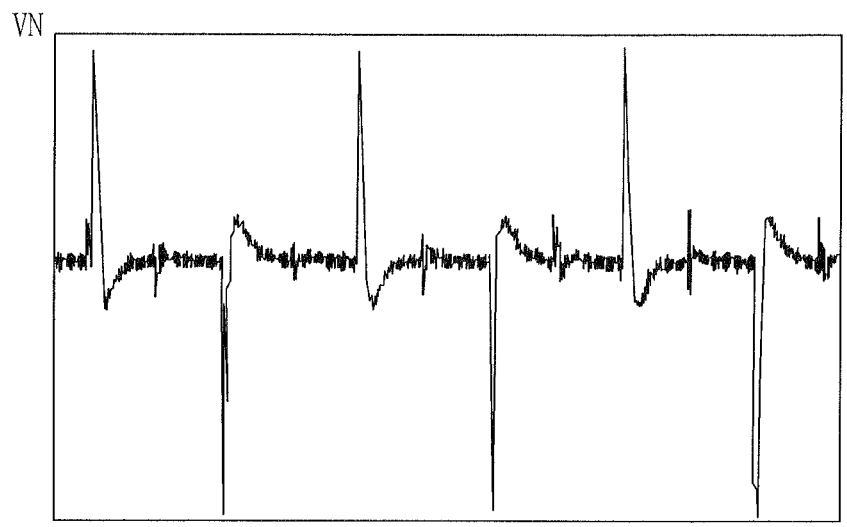
FIGS. 6A-C are diagrams illustrating waveforms of some signals of a capacitive multi-touch system according to an exemplary embodiment of the inventive concept.
Figure 6B:
Figure 6C:
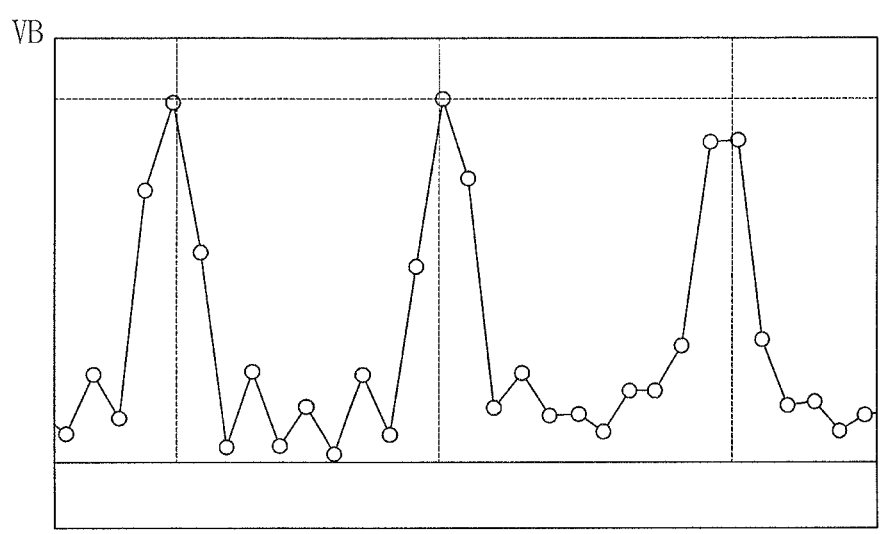

FIG. 6A to FIG. 6C are diagrams illustrating waveforms of some signals of the capacitive multi-touch system 100 of FIG. 1. FIG. 6A shows waveforms of a display noise. FIG. 6B shows the first signal VA. FIG. 6C shows the second signal VB showing digitally transformed waveform of the display noise as shown in FIG. 6A.

Referring to FIG. 5 and FIG. 6A to 6C, the waveform of the first signal VA, inputted to the display noise analyzer 153, is substantially similar to the (a) waveform of the noise VN that is generated in a liquid crystal panel of the display device 113. Peak values of (the) noise and intervals between peak values are calculated using the third signal VB that is an output of the peak/interval detector 176.

Figure 7:
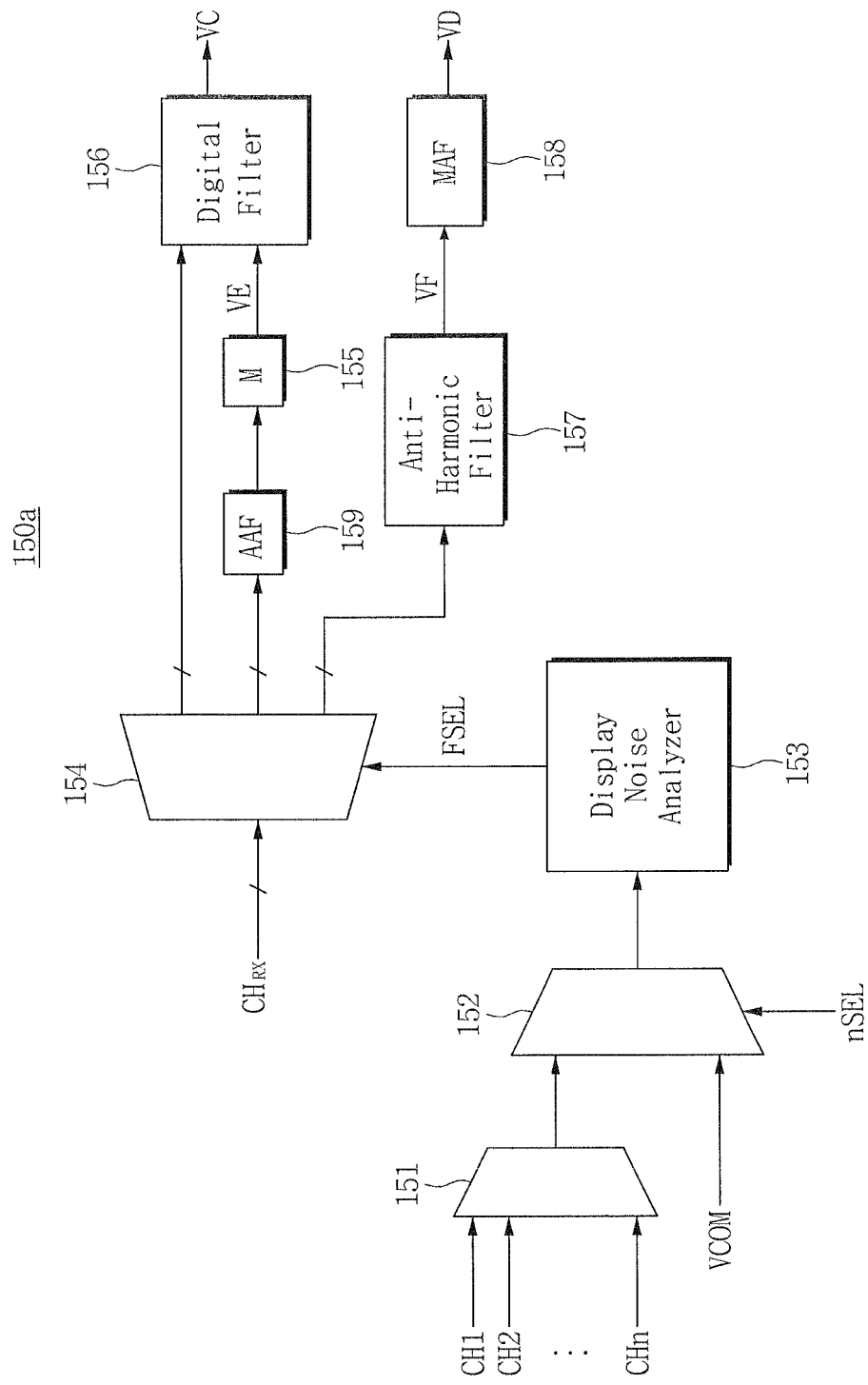
FIG. 7 is a circuit diagram illustrating a digital signal processor according to an exemplary embodiment of the inventive concept.

FIG. 7 is a circuit diagram illustrating an exemplary embodiment of a digital signal processor according to an exemplary embodiment. The digital signal processor 150 of FIG. 1 may be implemented as shown in FIG. 7.

Referring to FIG. 7, the digital signal processor 150a is substantially similar to that of FIG. 4, except that the digital signal processor 150a further includes an anti-aliasing filter 159 that eliminates noise included in the sensing channel signal $CH_{RX}$.

Figure 8:
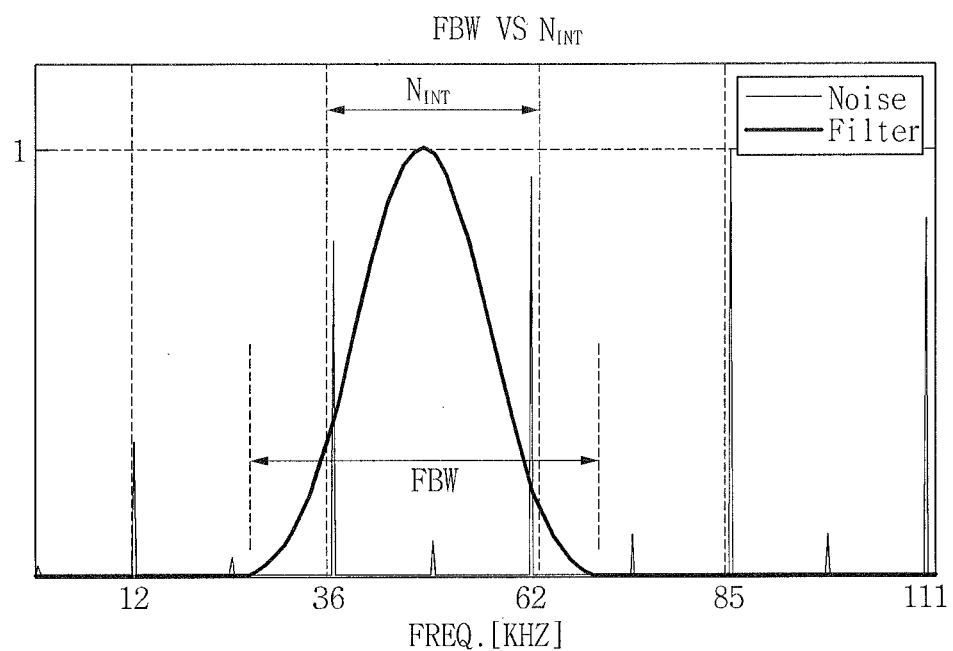
FIG. 8 is a diagram illustrating a bandwidth and noise interval of a filter included in a display noise analyzer according to an exemplary embodiment of the inventive concept.

FIG. 8 is a diagram illustrating a bandwidth of a filter according to an exemplary embodiment. The digital filter 156 of the display noise analyzers 150 and 150a may have such bandwidth of FIG. 8. Referring to FIG. 8, the bandwidth of the filter is greater than a noise interval NINT of an input signal. The input signal may be represented by FIG. 6C. The peak values of the noise are shown at frequencies of 36 kHz, 62 kHz, 85 kHz and 111 kHz.

Figure 9:
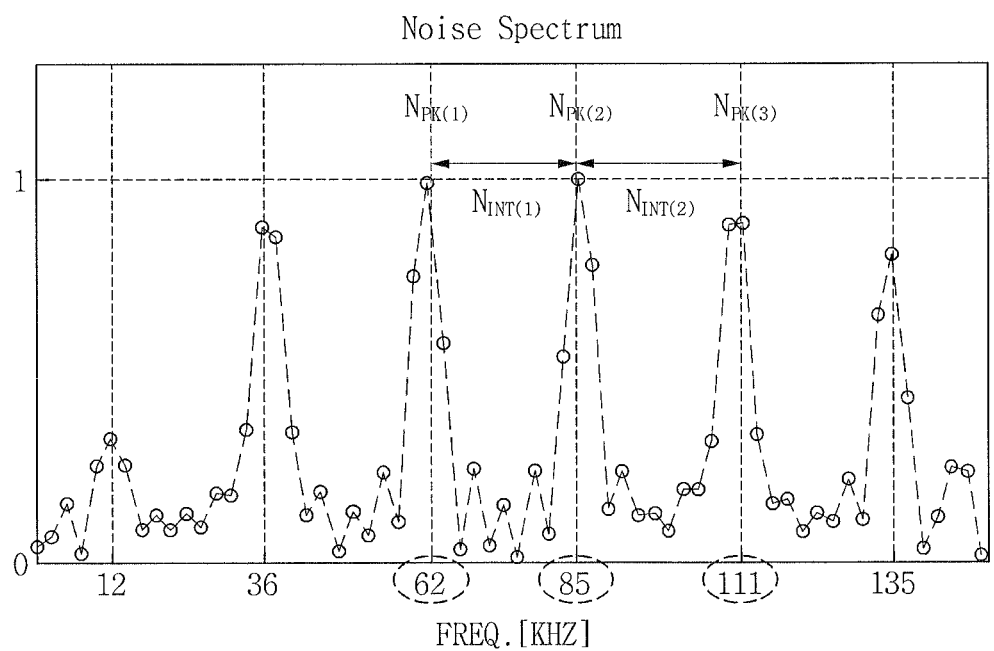
FIG. 9 is a diagram illustrating a noise spectrum of a display noise analyzer according to an exemplary embodiment of the inventive concept.

FIG. 9 is a diagram illustrating a noise spectrum of an output of a display noise analyzer 153.

Referring to FIG. 9, the noise interval NINT(1) between the first noise peak value NPK(1) and the second noise peak value NPK(2) is 23 kHz (=85 kHz−62 kHz), and the noise interval NINT(2) between the second noise peak value NPK(2) and the third noise peak value NPK(3) is 26 kHz (=111 kHz−85 kHz).

The digital signal processor 150 or 150a filters the sensing channel signal $CH_{RX}$ using the digital filter 156 if the filter bandwidth of the digital filter 156 is smaller than the noise interval of the common voltage $V_{COM}$. When the filter bandwidth of the digital filter 156 is greater than the noise interval and smaller than double the noise interval, the digital signal processor 150 or 150a filters the sensing channel signal $CH_{RX}$ using the decimation filter 154 and the digital filter 156. When the filter bandwidth of the digital filter 156 is greater than double the noise interval, the digital signal processor 150 or 150a filters the sensing channel signal $CH_{RX}$ using the anti-harmonic filter 157 and the moving average filter 158.

Figure 10:
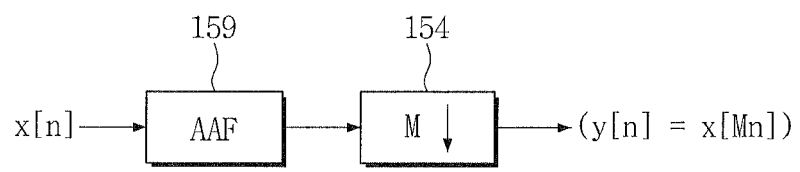
FIGS. 10 and 11 are diagrams illustrating operations of a decimation filter according to an exemplary embodiment of the inventive concept.
Figure 11:
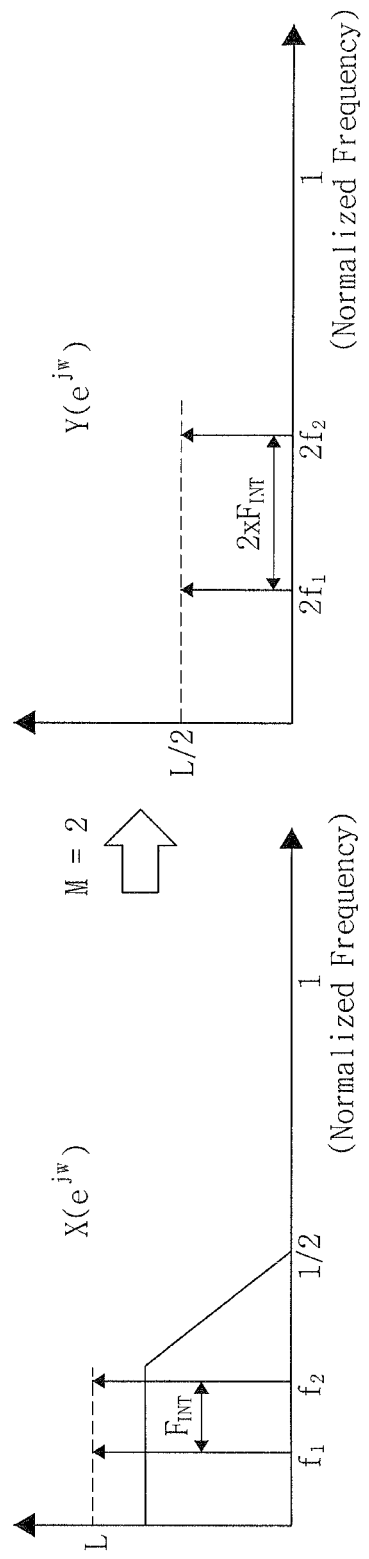

Hereinafter, a decimation filter operation will be described with reference to FIGS. 10 and 11. FIG. 10 is block diagram illustrating the digital signal processor 150 of FIG. 7 performing a decimation filter operation according to an exemplary embodiment. FIG. 11 shows waveforms of the input signal and the output signal of the decimation filter 154.

Referring to FIG. 10, an input signal is x[n] and an output signal is y[n]. The output signal y[n] is represented as y[n]=x[Mn]. Here, M denotes a decimation factor.

Referring to FIG. 11, when an input signal x[n] has a magnitude of L at a frequency f1 and a frequency f2, the corresponding output signal y[n] has a magnitude of L/2 at a frequency 2f1 and a frequency 2f2. Accordingly, after the decimation filtering operation is performed, a frequency interval $F_{INT}$ of the input signal x[n] becomes $2 \times F_{INT}$. The frequency interval $F_{INT}$ of the input signal x[n] becomes double using the decimation filter 154.

Figure 12:
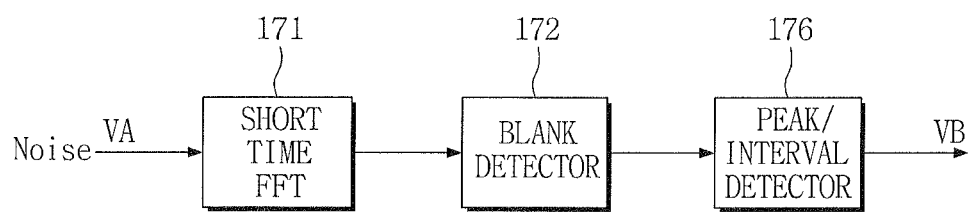
FIG. 12 is a block diagram illustrating a method of noise detection of a capacitive multi-touch system according to an exemplary embodiment of the inventive concept.

FIG. 12 is a block diagram illustrating a noise analyzer according to an exemplary embodiment. FIG. 12 shows an upper path of the display noise analyzer 153 of FIG. 5. The noise analyzer of FIG. 12 includes a first Fourier transformer 171, a blank detector 172, and a peak/interval detector 176. The circuit of FIG. 12 may be used when a blank period is known.

Figure 13:
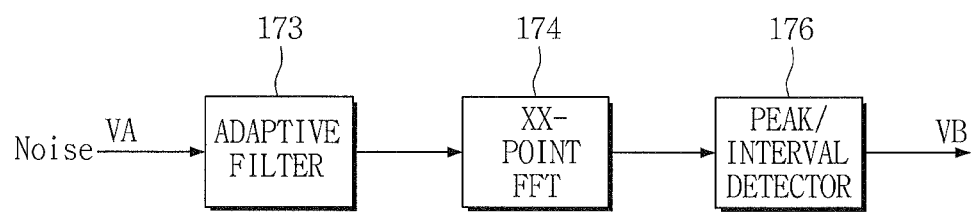
FIG. 13 is a circuit diagram illustrating a display noise analyzer according to an exemplary embodiment of the inventive concept.
Figure 16:
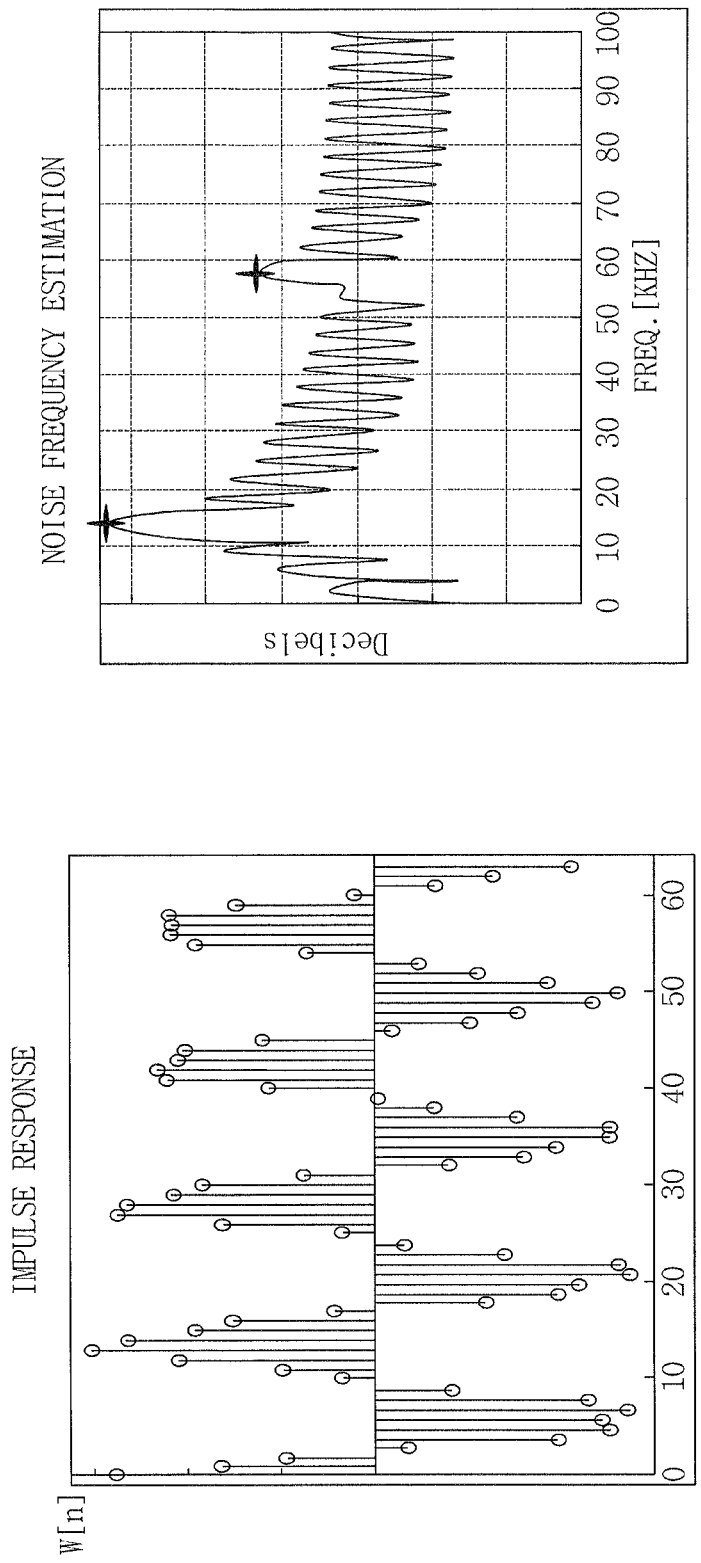
FIG. 16 is a block diagram illustrating a method of noise detection of a capacitive multi-touch system according to an exemplary embodiment of the inventive concept.

FIG. 13 is a block diagram illustrating a noise analyzer according to an exemplary embodiment. FIG. 16 shows a lower path of the display noise analyzer 153 of FIG. 5. The noise analyzer includes an adaptive filter 173, a second Fourier transformer 174, and a peak/interval detector 176. The circuit of FIG. 16 may be used when a blank period is not known.

Figure 14:
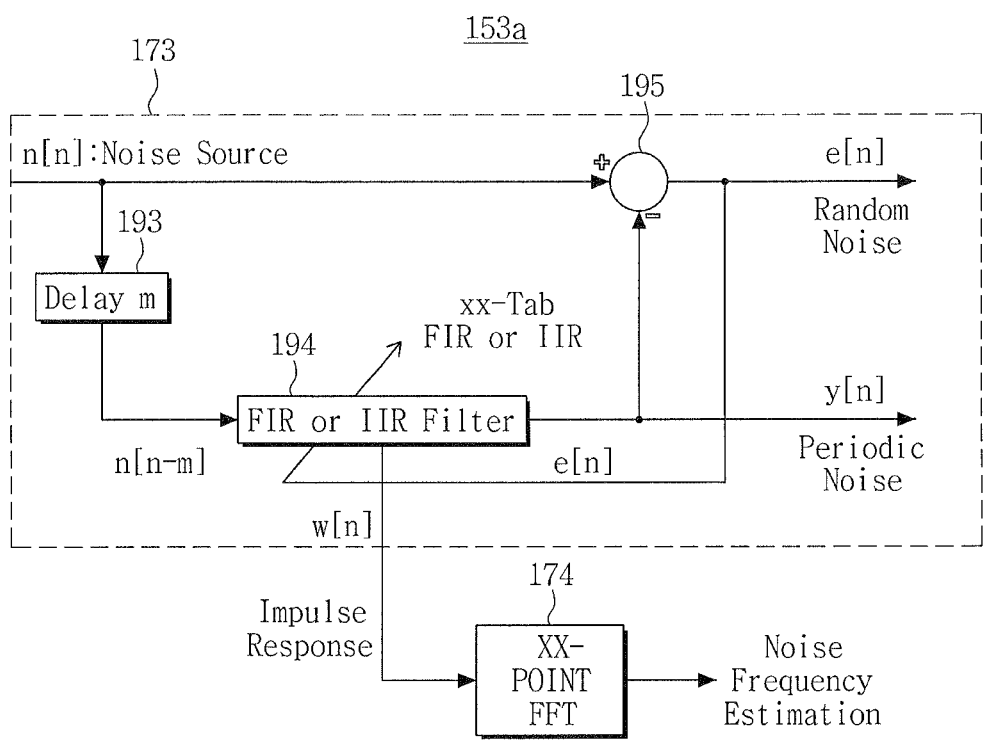
FIGS. 14 and 15 are diagrams illustrating waveforms of signals of a display noise analyzer according to an exemplary embodiment of the inventive concept.

FIG. 14 is a block diagram illustrating a display noise analyzer of FIG. 13 according to an exemplary embodiment.

Referring to FIG. 14, the adaptive filter 173 of FIG. 13 includes a delay 193 that delays a noise source n[n], an impulse response filter 194 that filters an output of the delay 193, a subtractor 195 that subtracts a first output of the impulse response filter 194 from the noise source n[n]. The point Fourier transformer 174 performs a point Fourier transform on an impulse response w[n] corresponding to a second output of the impulse response filter 194. In FIG. 14, the output of the subtractor 195 is random noise, and the first output of the impulse response filter 194 is periodic noise y[n].

Figure 15:
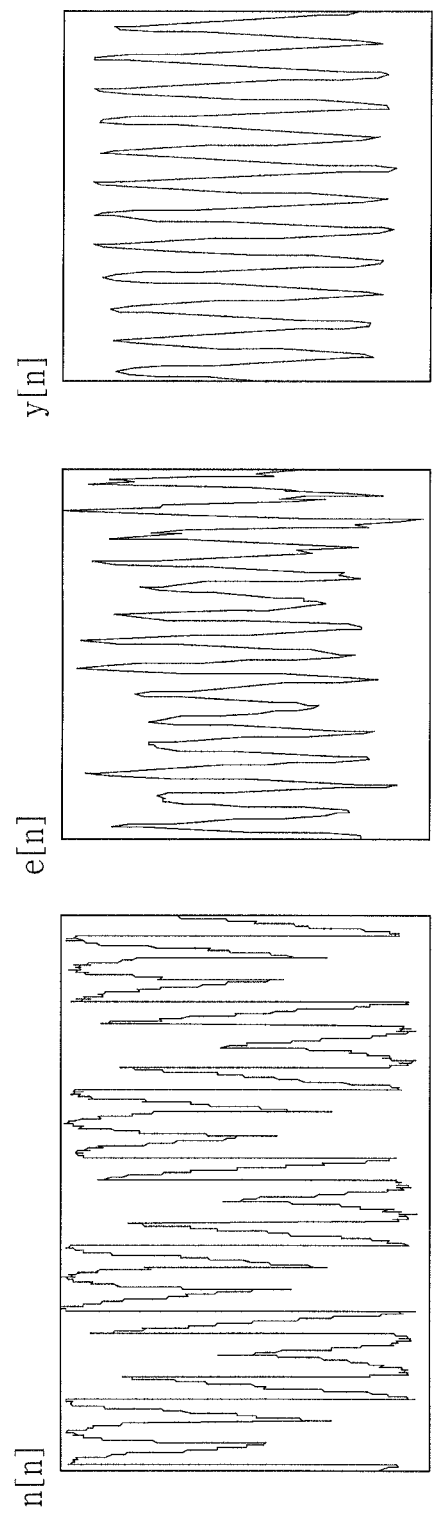

FIGS. 15 and 16 are diagrams illustrating waveforms of some signals of the display noise analyzer of FIG. 13. Referring to FIG. 15, the noise source n[n] is divided into random noise e[n] and periodic noise y[n]. The impulse response w[n] is shown in the left figure of FIG. 16, and a magnitude of noise versus frequency is shown in the right figure of FIG. 16. Referring to the right figure of FIG. 16, a peak frequency and an interval of the noise may be known.

Figure 17:
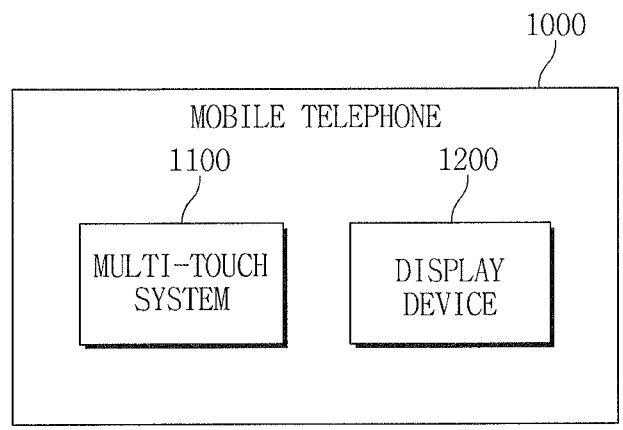
FIG. 17 is a block diagram illustrating a mobile phone including a capacitive multi-touch system according to an exemplary embodiment of the inventive concept.

FIG. 17 is a block diagram illustrating a mobile phone 1000 including a capacitive multi-touch system according to an exemplary embodiment of the inventive concepts.

Referring to FIG. 17, the mobile phone 1000 includes a capacitive multi-touch system 1100 and a display device 1200. The display device 1200 may be disposed under the capacitive multi-touch system 1100, and may provide a common voltage ($V_{COM}$) to the capacitive multi-touch system 1100. The display device 1200 may operate in response to an output of the capacitive multi-touch system 100. The capacitive multi-touch system 1100 may include the capacitive multi-touch system 100 of FIG. 1 according to an exemplary embodiment.

The capacitive multi-touch system 1100 may include a touch sensor panel, a front-end circuit, and a digital signal processor. The touch sensor panel generates a capacitance signal corresponding to a touch input. The front-end circuit converts the capacitance signal into a first voltage signal corresponding to the capacitance signal, and performs filtering and analog-to-digital conversion on the first voltage signal. The digital signal processor performs digital signal processing on an output signal of the front-end circuit. The digital signal processor receives a common voltage ($V_{COM}$) from a display device, analyzes a spectrum of noise included in the common voltage, and selects a noise filter based on the analysis results to perform filtering.

Figure 18:
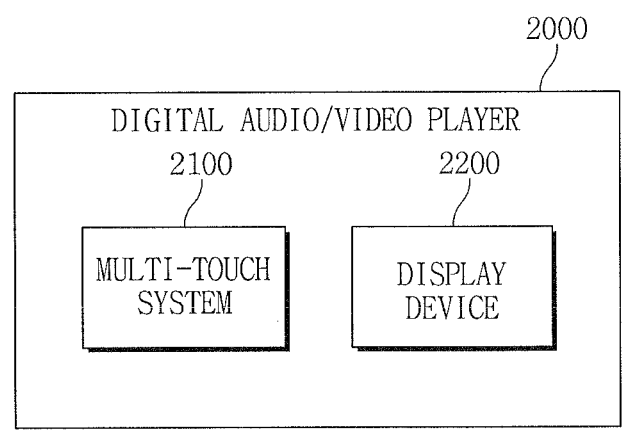
FIG. 18 is a block diagram illustrating a digital audio/video player including a capacitive multi-touch system according to an exemplary embodiment of the inventive concept.

FIG. 18 is a block diagram illustrating a digital audio/video player 2000 including a capacitive multi-touch system according to an exemplary embodiment of the inventive concept.

Referring to FIG. 17, the digital audio/video player 2000 may include a capacitive multi ouch system 2100 and a display device 2200. The display device 2200 may be disposed under the capacitive multi-touch system 2100, and may provide a common voltage ($V_{COM}$) to the capacitive multi-touch system 2100. The display device 1200 may operate in response to an output of the capacitive multi-touch system 100. The capacitive multi-touch system 2100 may include the capacitive multi-touch system 100 of FIG. 1 according to an exemplary embodiment of the inventive concept.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A capacitive multi-touch system, comprising:
   a touch sensor panel configured to generate a capacitance signal corresponding to a touch input;
   a front-end circuit configured to convert the capacitance signal to a sensing channel signal; and
   a digital signal processor configured to:
      receive a common voltage ($V_{COM}$) from a display device, calculate a noise interval of two neighboring noise peaks of the common voltage, and
      perform a noise filtering operation on the sensing channel signal using a noise filter path,
   wherein the noise filter path is selected from a plurality of noise filter paths based on the noise interval, and
   wherein the noise interval is measured in a frequency domain of the common voltage.

2. The capacitive multi-touch system of claim 1, wherein the front-end circuit comprises:
   a C-V converter configured to convert the capacitance signal to a first voltage signal;
   an anti-aliasing filter configured to eliminate noise of the first voltage signal to generate a second voltage signal; and
   an analog-to-digital converter configured to convert the second voltage signal to the sensing channel signal.

3. The capacitive multi-touch system of claim 1, wherein the digital signal processor comprises:
   a display noise analyzer configured to calculate the noise interval and generate a filter selecting signal based on the noise interval; and
   a demultiplexer configured to route the sensing channel signal to one of the plurality of filtering paths in response to the filter selecting signal.

4. The capacitive multi-touch system of claim 3, wherein the plurality of filtering paths comprises:
   a first filtering path having a digital filter,
   a second filtering path having a decimation filter and the digital filter, and
   a third filtering path having an anti-harmonic filter and a moving average filter.

5. The capacitive multi-touch system of claim 4, wherein the decimation filter is configured to perform a decimation filtering operation on the sensing channel signal received from the demultiplexer, the anti-harmonic filter is configured to eliminate harmonics of the sensing channel signal, and the moving average filter is configured to calculate a moving average of an output signal of the anti-harmonic filter.

6. The capacitive multi-touch system of claim 3, wherein the display noise analyzer comprises:
   a first Fourier transformer configured to perform a short-time Fourier transform on the common voltage; and
   a blank detector configured to detect a blank from an output signal of the first Fourier transformer;
   a peak/interval detector configured to detect the noise interval, wherein the noise interval corresponds to an interval between two neighboring peaks of an output signal of the blank detector; and a filter selector configured to generate the filter selecting signal based on the noise interval.

7. The capacitive multi-touch system of claim 3, wherein the display noise analyzer comprises:
an adaptive filter configured to perform an adaptive filtering operation on the common voltage;
a second Fourier transformer configured to perform a point Fourier transform on an output signal of the adaptive filter;
a peak/interval detector configured to detect the noise interval, wherein the noise interval corresponds to an interval between two neighboring peaks of an output signal of the second Fourier transformer; and
a filter selector configured to generate the filter selecting signal based on the noise interval.

8. The capacitive multi-touch system of claim 4, wherein the second filtering path further comprises an anti-aliasing filter configured to eliminate an aliasing noise of the sensing channel signal, wherein the anti-aliasing filter is disposed between the demultiplexer and the decimation filter.

9. The capacitive multi-touch system of claim 1,
if the noise interval is greater than a bandwidth of a digital filter, the noise filter path is a first noise filter path including the digital filter,
if the noise interval is smaller than the bandwidth of the first filter and double the noise interval is greater than the bandwidth of the first filter, the noise filter path is a second noise filter path including a decimation filter and the digital filter, and
if double the noise interval is smaller than the bandwidth of the first filter, the noise filter path is a third noise filter path including a moving average filter.

10. The capacitive multi-touch system of claim 9, wherein the moving average filter is configured to control a moving average value using a tap.

11. The capacitive multi-touch system of claim 9, wherein the third noise filter path further includes an anti-harmonic filter, wherein the anti-harmonic filter is disposed between the demultiplexer and the moving average filter.

12. A method of controlling a capacitive multi-touch system, the method comprising:
generating a capacitance signal corresponding to an input touch;
converting the capacitance signal to a sensing channel signal;
analyzing a noise spectrum of a common voltage (VCOM) to generate a filter selection signal;
performing a filtering operation on the sensing channel signal using a noise filtering operation selected by the filter selection signal,
wherein the analyzing of the noise spectrum further comprises;
calculating a noise interval of the common voltage;
comparing the noise interval to a bandwidth of a first filter; and
generating the filter selection signal based on the comparison result.

13. The method of claim 12, wherein
if the noise interval is greater than the bandwidth of the first filter, the filter selection signal selects the first filter,
if the noise interval is smaller than the bandwidth of the first filter and double the noise interval is greater than the bandwidth of the first filter, the filter selection signal selects a decimation filter, and
if double the noise interval is smaller than the bandwidth of the first filter, the filter selection signal selects a moving average filter.

14. The method according to claim 13, wherein the decimation filter is coupled to the first filter, wherein the first filter includes a digital filter.

15. The method according to claim 13, wherein the moving average filter is coupled to an anti-harmonic filter, wherein the anti-harmonic filter is configured to eliminate harmonics from the sensing channel signal, wherein and an output of the anti-harmonic filter is inputted to the moving average filter, and wherein the moving average filter is configured to calculate a moving average of the output of the anti-harmonic filter.

16. A capacitive multi-touch system, comprising:
a display device configured to operate using a common voltage;
a touch sensor panel disposed on the display device and configured to generate a sensing input signal corresponding to a touch input; and
a digital signal processor configured to analyze noise characteristics of the common voltage and perform a noise filtering operation on the sensing input signal based on the noise characteristics,
wherein the noise characteristics include a noise interval of two adjacent noise peaks of the common voltage, wherein the noise interval is measured in a frequency domain of the common voltage.

17. The capacitive multi-touch system of claim 16, wherein
if the noise interval is greater than a bandwidth of a digital filter, the digital signal processor is configured to perform the noise filtering operation using a first noise filter path including the digital filter,
if the noise interval is smaller than the bandwidth of the first filter and double the noise interval is greater than the bandwidth of the first filter, the digital signal processor is configured to perform the noise filtering operation using a second noise filter path including a decimation filter and the digital filter, and
if double the noise interval is smaller than the bandwidth of the first filter, the digital signal processor is configured to perform the noise filtering operation using a third noise filter path including a moving average filter.

* * * * *